Figure 1:
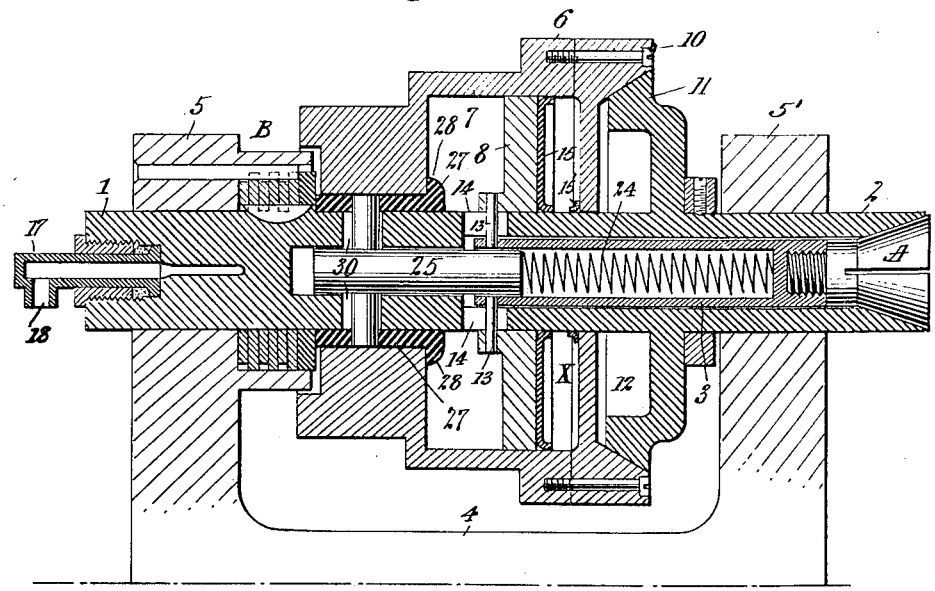

E. J. McCLELLAN.
LATHE.
APPLICATION FILED DEC. 3, 1909.

1,085,146.

Patented Jan. 27, 1914.

Witnesses:

Inventor
Edward J. McClellan
By his Attorneys

UNITED STATES PATENT OFFICE.

EDWARD J. McCLELLAN, OF NEW YORK, N. Y., ASSIGNOR TO THE GARVIN MACHINE COMPANY, A CORPORATION OF NEW YORK.

LATHE.

1,085,146. Specification of Letters Patent. Patented Jan. 27, 1914.

Application filed December 3, 1909. Serial No. 531,159.

*To all whom it may concern:*

Be it known that I, EDWARD J. McCLELLAN, a citizen of the United States, residing at the city of New York, in the borough of Manhattan and State of New York, have invented certain new and useful Improvements in Lathes, of which the following is a full, clear, and exact description.

This invention relates to a spindle construction for a monitor lathe, the principal object being to provide for gripping work in the spindle chuck and simultaneously starting the spindle in rotation by a single easy manipulation such, for example, as turning an air cock.

The invention further includes means for releasing the work from the chuck, disengaging the power or driving means, and braking the rotation of the spindle by a reverse manipulation of the actuating device.

From another aspect the present invention may be said to consist in an auxiliary power means for clutching the lathe spindle into action and causing its chuck to grip the work; or conversely, unclutching the lathe spindle, releasing the chuck and applying a braking or arresting means to check the momentum. I prefer to make use of compressed air for this auxiliary power, and I provide a cylinder within the usual cone pulley of the spindle, there being a piston movable therein by which the foregoing functions are secured. I also prefer to employ a draw tube or draw rod within the spindle by which the chuck is caused to grip the work, and which has an operative connection with the piston above mentioned.

By my invention the force of reaction is availed of to clutch the cone pulley to the spindle, and I provide a spring or its equivalent for throwing on the brake, the latter being preferably the normal condition, that is to say, established when said auxiliary power means is not in action.

The foregoing general purposes are in some ways generic and in some ways improvements on the construction of my prior monitor lathe spindle and chuck forming the subject of United States Letters Patent 927,424, and in which all the commercial mechanical details were particularly set forth and specified.

In view of the fact that the present invention can be made with any desired detail features in the matter of bearings, type of chuck, dimensions of spindle and parts, etc., in accordance with, for example, the principles of my prior patent, I have merely illustrated the invention of the present case in a more or less idealized or simple diagrammatic form, in order that the real features of the invention may be more clearly and briefly presented. That is to say, I have shown a form of chuck, bearings, cone pulley, and in fact all the parts, which while perfectly operative and practical, would ordinarily best be modified for the purposes of commercial manufacture and commercial use.

Figure 2:
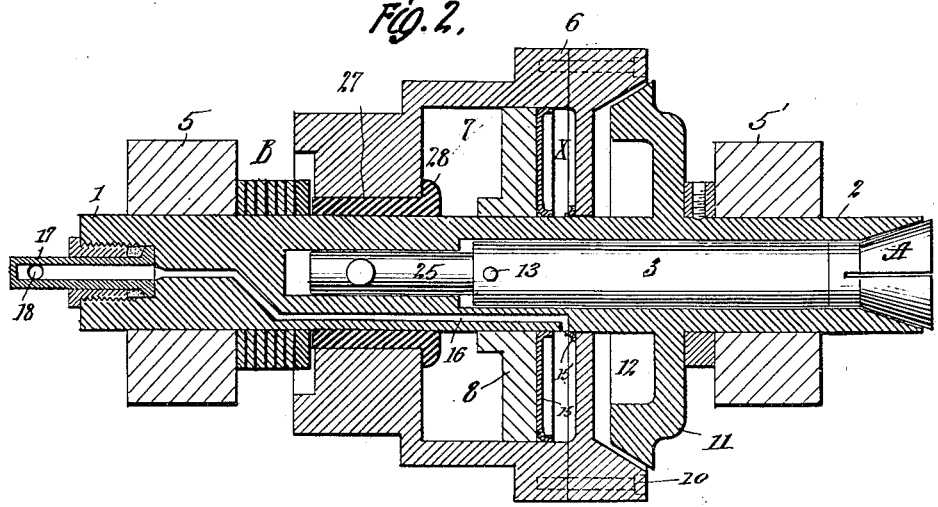

In the drawings Figure 1 is a vertical sectional view of a monitor lathe spindle embodying the principles of my invention, and Fig. 2 is a similar view in a plane at right angles to that of Fig. 1.

Referring to the drawings in which like parts are designated by the same reference sign, 1 denotes a lathe spindle having a nose 2 upon which the usual face plate or chuck is adapted to be fixed in the usual way. The spindle is of the class having a draw tube or draw rod 3, which coöperates with whatever chuck is employed to grip and ungrip the latter upon the work. As will later appear, the gripping of the chuck has an influence or relation to the action of the clutch and brake, presently described. I have, therefore, included a small collet chuck A in the illustration, the showing being, however, purely diagrammatic. It will be understood that ordinarily a chuck of the sort shown for example in my Patent No. 927,424 may be employed, or a modification of such device.

4 denotes the usual head-stock of the lathe having bearings 5, 5' in which the spindle is journaled, and which may be of any desired or approved construction, such for example, as shown in my prior patent referred to.

6 indicates a cone pulley loosely rotatable on the spindle 1 and having an interior cylindrical bore 7.

8 designates a piston longitudinally slidable with respect to the spindle 1 and located within the bore 7 of the cone pulley. In order to secure certain functions, later described, the bore 7 is made concentric with the axis of the spindle 1, so that the cone pulley may rotate independently of the piston 8, as well as of the spindle.

The cone pulley 6 is formed or provided with one member 10 of a clutch 12, preferably a cone friction clutch. The other or driven clutch surface or member 11 is fixed to or forms part of the spindle 1. The relation is such that when the cone pulley 6 is impelled longitudinally of the spindle, it grips or ungrips the driven clutch member of the spindle in accordance with the direction in which it is displaced. The piston 8 is fixed to the draw tube or draw rod 3 by any suitable means 13 passing through elongated slots 14 of the spindle. The cavity X on the side of the piston 8 toward the nose of the spindle is made air or fluid pressure tight by any suitable packings 15, 15′, and a passage 16 is formed in the spindle 1, communicating with a stuffing box or gland 17 and an air or fluid inlet pipe 18. It is evident that when fluid pressure is applied through this inlet, that a force is created pressing the piston 8 toward the left in the drawings, at the same time pressing the cone pulley 6 toward the right by the force of reaction.

Inasmuch as the piston has been described as connected to the draw tube 3, and the latter provided with a chuck denoted A, it follows that the chuck will be tightened on the work by the drawing in of the draw tube or rod 3, and as soon as said chuck has gripped the work and is incapable of any further inward drawing action, it becomes in effect solid or rigid with the spindle. As soon as this stage is reached, it becomes easy to appreciate that the force of reaction heretofore referred to and impelling the cone pulley 6 to the right effects an engagement between the clutch surfaces 10 and 11. It is necessary to consider the gripping of the chuck on the work in the foregoing action, because without this the clutch member 11 would yield toward the right until it was pressed against the bearing 5′, and such pressure against said bearing would act as a brake and impede rotation of the spindle. By virtue of the gripping of the chuck, however, the clutch member 11 is in effect anchored rigidly to the piston 8, so that the only effect of the fluid pressure is to throw the cone pulley to the right with respect to the virtually locked together piston 8 and the clutch member 11. The result is to tighten said clutch without causing any braking action on the bearings 5, 5′.

I regard the foregoing as a complete invention, but I have provided additional features which may be considered in their aspects either separately or in combination with the foregoing. An important feature relates to braking the rotation of the spindle when the chuck and clutch, gripped as above described, are released. In order to automatically release the clutch and chuck I prefer to employ a spring or equivalent pressure means 24, which is most conveniently located within or around the draw tube or rod 3. At its rear end the spring rests on an abutment 25, whereby it acts constantly to impel the piston 8 to the right, or in other words in direct opposition to the fluid pressure. The action of this spring in the absence of any fluid pressure, thereby serves to release both the chuck A and clutch 12. In order to secure the braking function above referred to, I make the abutment 25 for the spring 24 in the form of a plug axially slidable within the spindle 1. This plug is pinned or otherwise fixedly connected to a sleeve 27, which is adapted to act as a bushing on which the cone pulley 6 is rotatable on one end. A feature of the sleeve 27 consists, however, in the fact that it cannot be thrust to the left in the drawings in the absence of a corresponding movement of the cone pulley 6, this being secured by a bead or collar 28 on said sleeve. The abutment 25 with its sleeve 27 are, however, movable longitudinally independent of the spindle 1, there being a slot or slots 30 in the spindle of such dimensions as to permit this movement; these slots receiving the pin or connecting means between the abutment 25 and the sleeve 27.

I have already described the use and operation of the invention in its aspects with respect to the gripping of chuck A and clutch 11. It is therefore merely necessary to consider the additional features of the operation taking place when the chuck and clutch are ungripped and the brake operated to arrest the rotation of the spindle. Assuming that air or fluid pressure is relieved in the pipe 18, it is evident that the force of the spring 24, tending to impel the draw tube to the right in the drawings, will accomplish such function as soon as the fluid pressure is withdrawn from the piston 8. The direct and obvious effect is to ungrip the chuck A, and at the same time permit the clutch member 11 to move toward the right as far as possible, that is, until it engages the bearing 5′. The release of the fluid pressure in the cavity X at the same time removes the force of reaction which previously impelled the cone pulley 6 toward the right, as above described. The cone pulley 6 is therefore now free to move in the direction in which it may be impelled by the spring 24, and by virtue of the reaction of said spring against the plug or abutment 25, connected as this part is with the sleeve 27 and collar 28, said spring obviously impels the cone pulley 6 toward the left. The cone pulley 6 moves toward the left as far as possible, that is, until sleeve 27 engages the bearing 5 or some part thereof. It is evident that by the foregoing action the sleeve 27 is impelled toward the rear bearing 5 and the clutch member 11 toward the front bearing 5′ with the full effective pressure of the spring 24, resulting in a braking action proportionate in degree to the power of the spring. This may be made of any strength desired. In the foregoing action the clutch surfaces 10 and 11 are, of course, separated to their limit of separation.

In my practical construction I make use of a form of brake of the multiple disk type and which is broadly denoted B in the drawing. There are provided a series of disks keyed to the spindle 1 and an alternate series keyed or pinned to the bearing 5. All of the disks are capable of longitudinal movement on the spindle, so that when the cone sleeve 27 is pressed to the left in the manner already described, all of the said disks are borne against one another with corresponding force or pressure, and the braking effect is multiplied by the number of engaging surfaces. It is evident that any desired construction of brake may be employed, or the sleeves caused to bear directly against the bearing 5, thus providing a braking engagement by its contact with the bearing. In any case it is evident that the brake is released by the admission of air or fluid pressure to the cavity X, this serving to force the cone pulley to the right, drawing over the sleeve 27, and relieving the brake in the manner already described.

Having described my invention, what I claim, is:

1. The combination of a lathe spindle carrying a driven clutch member and a chuck, a pulley having a driving clutch member, a movable part within the pulley and connected with the chuck and auxiliary power means adapted to act simultaneously and in opposite directions on said movable part to close the chuck and on one of said clutch members to close the clutch.

2. The combination of a lathe spindle carrying a driven clutch member and a chuck, a pulley having a driving clutch member, a movable part within the pulley and connected with the chuck and auxiliary power means adapted to act simultaneously and in opposite directions on said movable part to close the chuck and on one of said clutch members to close the clutch and a brake operated by the release of said auxiliary power means.

3. The combination of a lathe spindle carrying a driven clutch member and a chuck, a pulley having a driving clutch member, a piston within the pulley and connected with the chuck and means for applying fluid pressure to move the piston in one direction and the driving clutch member in the opposite direction, to thereby simultaneously tighten the chuck and close the clutch.

4. The combination of a lathe spindle carrying a driven clutch member and a chuck, a pulley having a driving clutch member, a piston within the pulley and connected with the chuck and means for applying fluid pressure to move the piston in one direction and the driving clutch member in the opposite direction, to thereby simultaneously tighten the chuck and close the clutch, a brake and a constantly acting pressure means tending to apply the brake.

5. In a lathe, a revoluble structure comprising clutch parts, chuck operating parts, and a chuck, one of said clutch parts being connected to one of said chuck operating parts, power actuated apparatus for engaging said clutch parts one with the other and for simultaneously moving one of said chuck operating parts with respect to another of the same for actuating said chuck, said apparatus comprising parts movable in opposite directions, one of said parts being connected to one of said clutch parts, and another of said parts being connected to one of the chuck operating parts, and means for delivering auxiliary power to said apparatus.

6. In a lathe, a revoluble structure comprising clutch parts, chuck operating parts, and a chuck, one of said clutch parts being connected to one of said chuck operating parts, power actuated apparatus for engaging said clutch parts one with the other and for simultaneously moving one of said chuck operating parts with respect to another of the same for actuating said chuck, said apparatus comprising parts movable in opposite directions, one of said parts being connected to one of said clutch parts and another of said parts being connected to one of the chuck operating parts, and means for delivering auxiliary power to said apparatus, a spring normally impelling one of said chuck operating parts into disengaging position for releasing the chuck, and means for transmitting the reaction of said spring to a part connected to one of the clutch parts.

7. In a lathe, a revoluble structure comprising clutch parts, chuck operating parts, and a chuck, one of said clutch parts being connected to one of said chuck operating parts, power actuated apparatus for engaging said clutch parts one with the other and for simultaneously moving one of said chuck operating parts with respect to another of the same for actuating said chuck, said apparatus comprising parts movable in opposite directions, one of said parts being connected to one of said clutch parts and to a pulley portion of the structure, and another of the said parts being connected to one of the chuck operated parts, means for delivering power to said apparatus, a spring normally impelling one of said chuck operating parts into disengaging position for releasing the chuck, and means for transmitting the action of said spring to a part connected with one of said clutch parts and thereby to the corresponding clutch part.

In witness whereof, I subscribe my signature, in the presence of two witnesses.

EDWARD J. McCLELLAN.

Witnesses:
J. T. WILLIAMS,
CHAS. T. LUTHER.